(12) United States Patent
Pang et al.

(10) Patent No.: US 7,485,350 B2
(45) Date of Patent: Feb. 3, 2009

(54) LIQUID CRYSTAL DISPLAY DEVICE WITHOUT BAD PIXEL AND METHOD FOR REMOVING BAD PIXEL THEREFROM

(75) Inventors: Hee-Suk Pang, Gyeonggi-Do (KR); Jong-Hwa Lee, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 274 days.

(21) Appl. No.: 11/477,934

(22) Filed: Jun. 30, 2006

(65) Prior Publication Data

US 2007/0003846 A1   Jan. 4, 2007

(30) Foreign Application Priority Data

Jun. 30, 2005   (KR) .................. 10-2005-0058948

(51) Int. Cl.
*C09K 19/00* (2006.01)
*C09K 19/52* (2006.01)

(52) U.S. Cl. .................. 428/1.1; 430/20; 252/299.01; 349/84; 349/110

(58) Field of Classification Search .............. 349/84, 349/110; 428/1.1; 430/20; 252/299.1
See application file for complete search history.

(56) References Cited

U.S. PATENT DOCUMENTS 6,392,729 B1 *   5/2002   Izumi et al. ................. 349/110
6,750,929 B2 *   6/2004   Nagashima et al. ......... 349/110

* cited by examiner

*Primary Examiner*—Geraldina Visconti
(74) *Attorney, Agent, or Firm*—Birch, Stewart, Kolasch & Birch, LLP

(57) ABSTRACT

A liquid crystal display (LCD) device and method for addressing a defective pixel of the liquid crystal display (LCD) device, are discussed. According to an embodiment, the method includes forming a black resin film on at least one LCD panel; operating the LCD panel to selectively harden a portion of the black resin film corresponding to a spot where a defective pixel is present; and removing the black resin film, except for the hardened portion of the black resin film.

16 Claims, 4 Drawing Sheets

LIQUID CRYSTAL DISPLAY DEVICE WITHOUT BAD PIXEL AND METHOD FOR REMOVING BAD PIXEL THEREFROM

This application claims priority to Korean Patent Application No. 10-2005-0058948 filed in Korea on Jun. 30, 2005, the entire contents of which are incorporated by reference in its entirety.

BACKGROUND OF THE INVENTION

1. Field of the Invention

The present invention relates to a method for addressing bad (defective) pixels of a liquid crystal display (LCD) device, and particularly, to a method of compensating for the bad pixels of an LCD device, which is capable of removing a bright point from the LCD panel by attaching a photosensitive black resin and then hardening the black resin by the light from the bright point.

2. Discussion of the Related Art

A liquid crystal display (LCD) device generally denotes a transmissive type flat-panel display device, which is being broadly used in various electric devices such as mobile phones, Personal Digital Assistants (PDAs), notebook computers, etc. The LCD devices can extensively be used owing to their compact construction, light weight, and low power-consumption characteristics, and to their superior ability to display images. In addition, as digital TVs, TVs with high qualities for images, TVs mounted on a wall, and the like, are in increasing demand, researches for large LCD devices capable of being applied to TVs are actively being conducted.

In general, the types of LCDs may depend on methods for operating liquid crystal molecules. In recent times, active matrix thin film transistor (TFT) LCDs are often used in view of their fast reaction speed and rare ghosts.

FIG. 1 shows a structure of a TFT LCD panel 1 according to a related art. As shown in FIG. 1, the TFT LCD panel 1 includes a plurality of gate lines and data lines which are arranged vertically and horizontally to thus define a plurality of pixels. A switching device, namely, a TFT 7 is arranged within each pixel. When a scan signal is inputted through the gate line 3, the TFT 7 is switched to thus apply a signal inputted through the data line 5 to a liquid crystal layer 9. In the drawing, reference numeral 11 denotes a storage capacitor which maintains an inputted data signal until the next scan signal is applied.

The structure of the LCD panel 1 having such construction will now be explained with reference to the sectional view shown in FIG. 2. Here, one pixel of the plurality of pixels is shown in the drawing.

As shown in FIG. 2, a gate electrode 24 formed of a metal is formed on a lower substrate 20 which is formed of a transparent insulating material such as glass. A gate insulating layer 22 is deposited on the entire lower substrate 20 on which the gate electrode 24 is formed. A semiconductor layer 26 is formed on the gate insulating layer 22. Source/drain electrodes 28 formed of a metal are formed on the semiconductor layer 26. A passivation layer 32 is formed on the source/drain electrodes 28. A pixel electrode 30 which is formed of a metal such as Indium Tin Oxide (ITO) is formed on the passivation layer 32. Here, the pixel electrode 30 is electrically connected to the drain electrode 28 via a contact hole formed in the passivation layer 32.

The LCD device having such construction is completely fabricated by undergoing a testing process. The testing process is typically performed by being divided into an appearance test and a lighting test. The lighting test is performed such that a test signal is applied to the fabricated LCD device to test (detect) whether there are any bad (defective) pixels in the LCD device. If a gate line or data line is inferior, pixels formed on the corresponding line become inferior or defective. Also, if a TFT formed on a pixel is inferior, the corresponding pixel also become inferior.

In general, the LCD device having inferior pixels is discarded as inferior products. If a series of pixels formed along a gate line or data line are inferior, it is preferable to discard the LCD device. However, it is wasteful to discard the LCD device in case that the small number of pixels are inferior.

SUMMARY OF THE INVENTION

Therefore, an object of the present invention is to provide a method for removing bad (inferior) pixels of a liquid crystal display (LCD) device which is capable of preventing a user from recognizing bad pixels simply by changing a bright point of a bad pixel into a black point by preventing light from being transmitted through the bad pixel, and to provide an LCD device without bad pixels.

Another object of the present invention is to provide a method for removing bad pixels which is capable of removing bad pixels in a fast and inexpensive manner, wherein a black resin film is attached onto an LCD panel and the portion of the black resin film is hardened by light transmitted through a bad pixel so as to form a light shielding layer for the bad pixel, and to provide an LCD device without bad pixels.

Another object of the present invention is to provide an LCD device and a method of addressing defective pixels of the LCD device, by covering the defective pixels so as to minimize the effect of the defective pixels.

Another object of the present invention is to provide an LCD device and a method of addressing defective pixels of the LCD device, which address the limitations and disadvantages associated with the related art LCD device and method.

To achieve these and other advantages and in accordance with the purpose of the present invention, as embodied and broadly described herein, according to an embodiment, there is provided a method for repairing bad pixels of a liquid crystal display (LCD) device, comprising: forming a black resin film on a plurality of LCD panels; operating the plurality of LCD panels to harden the black resin corresponding to spots where the bad pixels have been generated; and removing the black resin film except for the hardened black resin. The black resin can be hardened by light transmitted through the bad pixel during an operation of the LCD panel, wherein the LCD panel is operated in a black mode.

An LCD device according to an aspect of the present invention comprises an LCD panel containing a bad pixel, and a black resin formed on the LCD panel corresponding to a spot where the bad pixel has been generated to thus prevent light from being transmitted through the bad pixel. The LCD panel comprises a first substrate having TFTs and an electrode, a second substrate having a color filter layer, and a liquid crystal layer formed between the first and second substrates.

According to an aspect, the present invention provides a method for addressing a defective pixel of a liquid crystal display (LCD) device, the method comprising: forming a black resin film on at least one LCD panel; operating the LCD panel to selectively harden a portion of the black resin film corresponding to a spot where a defective pixel is present; and removing the black resin film, except for the hardened portion of the black resin film.

According to another aspect, the present invention provides a liquid crystal display (LCD) device comprising: an LCD panel containing a defective pixel; and a light shielding layer formed of at least a black resin and formed at the LCD panel corresponding to a spot where the defective pixel is present, so as to shield light transmitted therethrough.

According to another aspect, the present invention provides a liquid crystal display (LCD) device comprising: an LCD panel; and a transforming layer on the LCD panel, the transforming layer being hardened by a light from a defective pixel of the LCD panel, and transforming a bright spot of the defective pixel into a dark spot.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Description will now be given in detail of the preferred embodiments of the present invention, with reference to the accompanying drawings.

When a bad (defective) pixel is generated due to a defect of a switching device such as a thin film transistor or an opening in a pixel electrode, even though an image signal is applied, the switching device may not be operated or the image signal may not be applied to the pixel electrode. Accordingly, an optical transmissivity may not be controlled in the corresponding pixel, and thereby light supplied from a backlight unit may be transmitted through the corresponding pixel. That is, a bright point is generated on a screen corresponding to the spot where the bad pixel is located. The bright point is easily spotted by a user at the LCD device which usually displays moving pictures like in an LCD TV, which is thus problematic.

On the other hand, if a dark point other than the bright point is generated by the bad pixel, the user may not see or easily spot the dark point. Thus, if the bright point of the defective pixel can be changed to a dark point, then the user would not notice the defective pixel.

The present invention focuses on this point of view to solve the inferiority of pixels. In stead of physically replacing or repairing the defective pixel to provide a normal (good) pixel, a bright point of the bad (defective) pixel is changed into a dark point to thus make the user not spot and recognize the existence of the bad pixel. Hence, a replacement or repair process of the defective pixel, which requires complicated steps and high expense, is not needed according to the present invention.

According to an embodiment of the present invention, a bright point can be changed into a dark point by directly applying a black color or attaching a light shielding material on a spot where the bright point is present due to the defective pixel. However, the spots where the bad pixels have been generated are different in different LCD devices which are massively produced. Accordingly, in order to attach the light shielding material directly on the bright point of a bad pixel, an operator must find out the bright points generated in every LCD device one by one to thereby manually attach the light shielding material thereon, which is actually impossible to perform.

In the present invention, in stead of having the operator manually shield the bright points, a series of processes, namely, a light hardening process by use of light transmitted through the bad pixel can be performed such that light can be prevented from being transmitted through every bad pixel.

Figure 1:
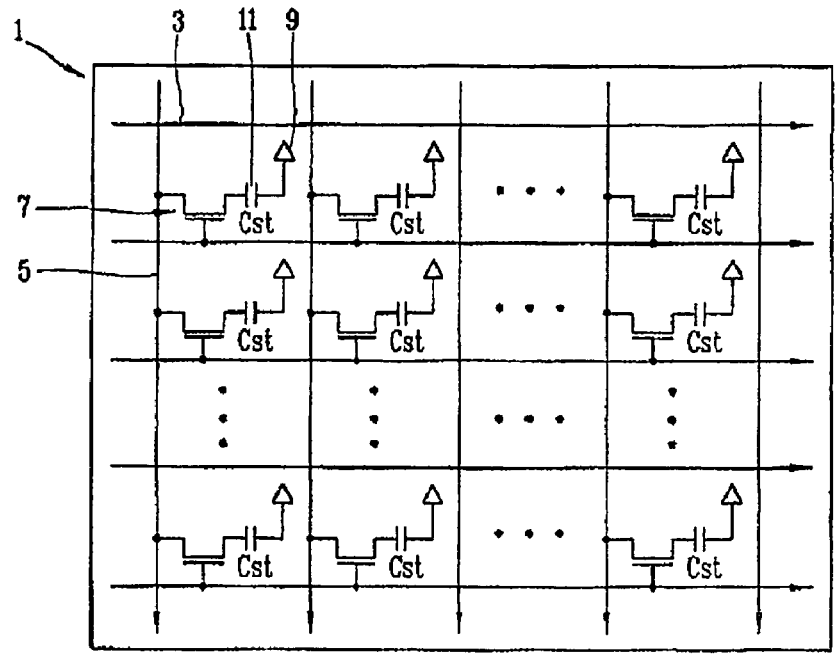
FIG. 1 is a plan view showing an LCD device according to a related art.
Figure 2:
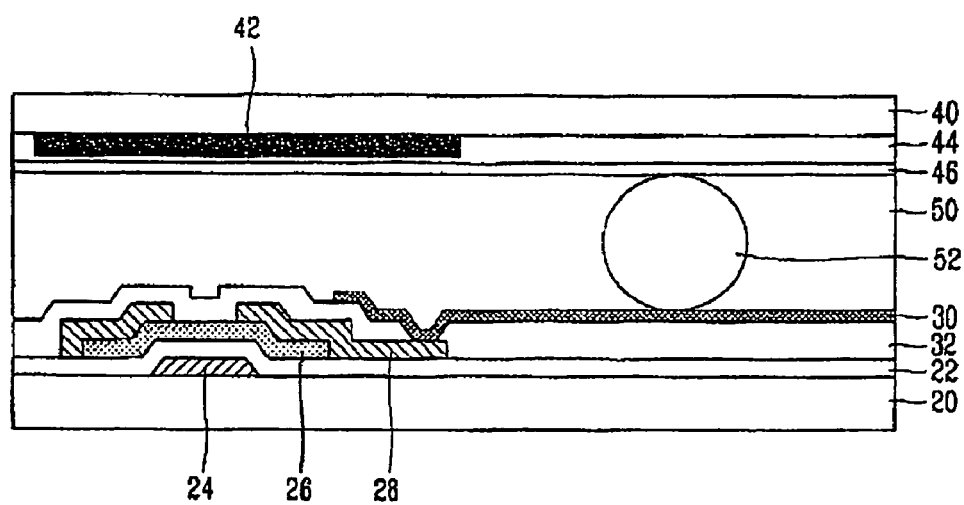
FIG. 2 is a sectional view showing a structure of the LCD device of FIG. 1.

FIGS. 3A through 3D show a method for compensating defective pixels of an LCD device according to the present invention. The LCD device of FIGS. 3A-3D are operatively configured and includes conventional components not affecting the present invention, e.g., TFTS, pixel electrodes, color filter layers, etc., e.g., as shown in FIGS. 1 and 2.

Figure 3A:
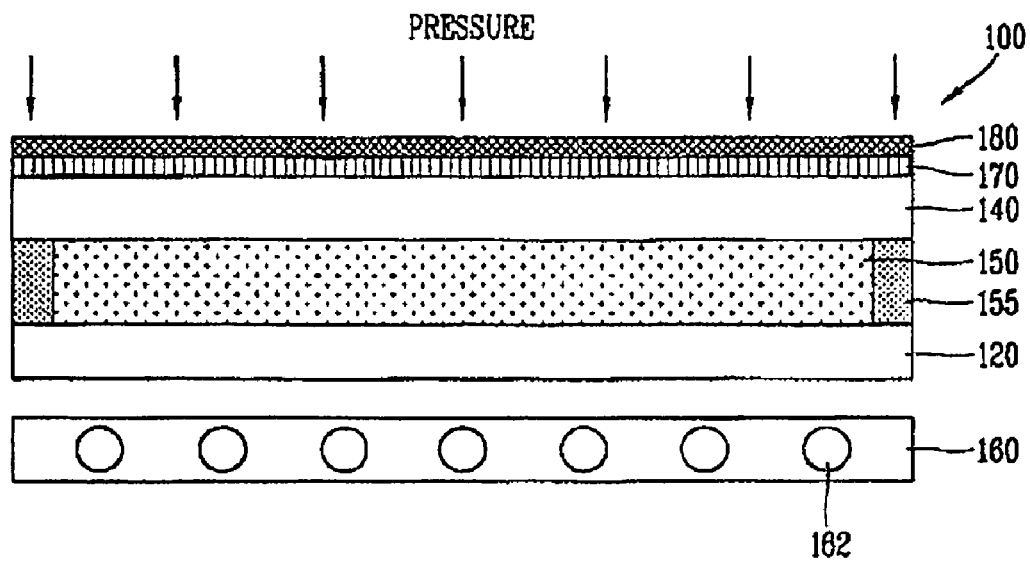
FIGS. 3A through 3D are views showing a method for addressing bad pixels of an LCD device according to the present invention.

As shown in FIG. 3A, first, a lighting test is performed onto the LCD panel 100 in order to detect whether a bad pixel has been generated therein. The LCD panel 100 includes a first substrate 120 and a second substrate 140 which are formed of a transparent glass or the like, and a liquid crystal layer 150 disposed therebetween. The first and second substrates 120 and 140 are bonded to each other by a sealant 155, and simultaneously the liquid crystal layer 150 is encapsulated by the sealant 155. The first substrate 120 can denote a TFT array substrate on which various electrodes such as a switching device (i.e., TFT) and a pixel electrode are formed, and the second substrate 140 can denote a color filter substrate on which a color filter layer is formed. Other variations are possible.

Also, a polarizer 170 is attached to an upper portion of the second substrate 140, and a backlight unit 160 having lamps 162, LEDs or other light source for emitting light is disposed at a lower portion of the first substrate 120. Although not shown, the backlight unit 160 can be provided with a light guide plate for guiding the light emitted from the lamps 162 to the LCD panel 100 and/or various optical sheets for improving an optical efficiency.

Generally, the lighting test for detecting the bad pixels is performed by placing the LCD panel having such construction on a test board that emits light to apply a signal to the LCD panel. The detecting (testing) of the bad pixels is performed by observing whether the bright points have been generated on the screen when the signal is applied.

When no bad pixel is detected, the corresponding LCD panel 100 is determined to have a good quality. On the other hand, when the bright points are seen on the screen, it is determined the bad pixel are present or have been generated. Accordingly, a photosensitive black resin film 180 is placed on the polarizer 170 and a pressure is applied thereto to attach the photosensitive black resin film 180 onto the polarizer 170.

Figure 4A:
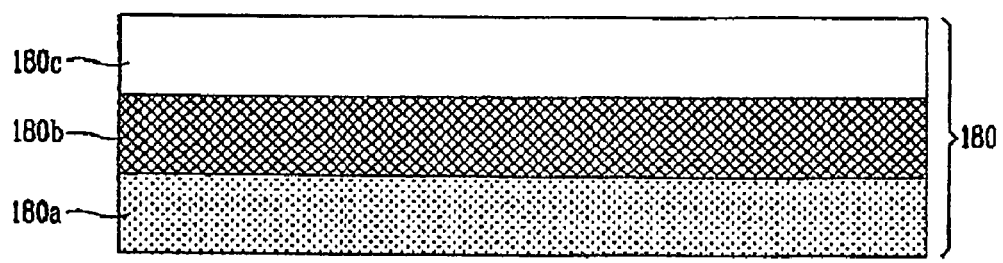
FIG. 4A is a sectional view showing a structure of a black resin film used in the present invention.
Figure 4B:
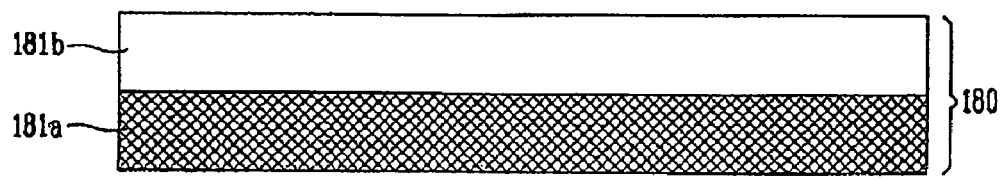
FIG. 4B is a sectional view showing another structure of the black resin film used in the present invention.

As shown in FIG. 4A, the photosensitive black resin film 180 is composed of an optical hardening layer 180a which is hardened when light is irradiated thereon, a black resin layer 180b formed of a black resin for shielding light, and a passivation film 180c for protecting the black resin layer 180b. As an alternative, the black resin film 180, as shown in FIG. 4B, is composed of an optical hardening layer 181a which is hardened by being mixed with black nano particles and simultaneously shields light, and a passivation film 181b.

Figure 3B:
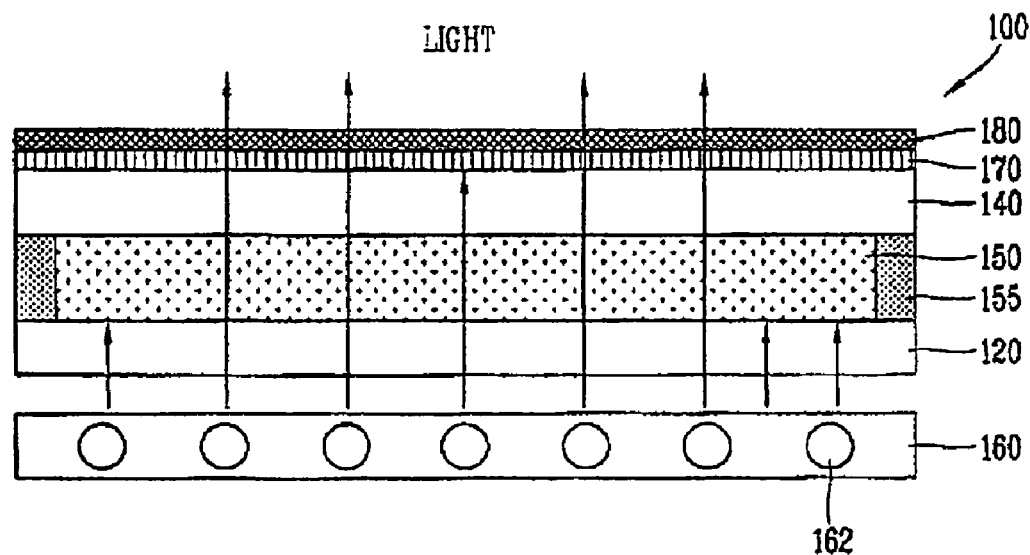
Figure 3C:
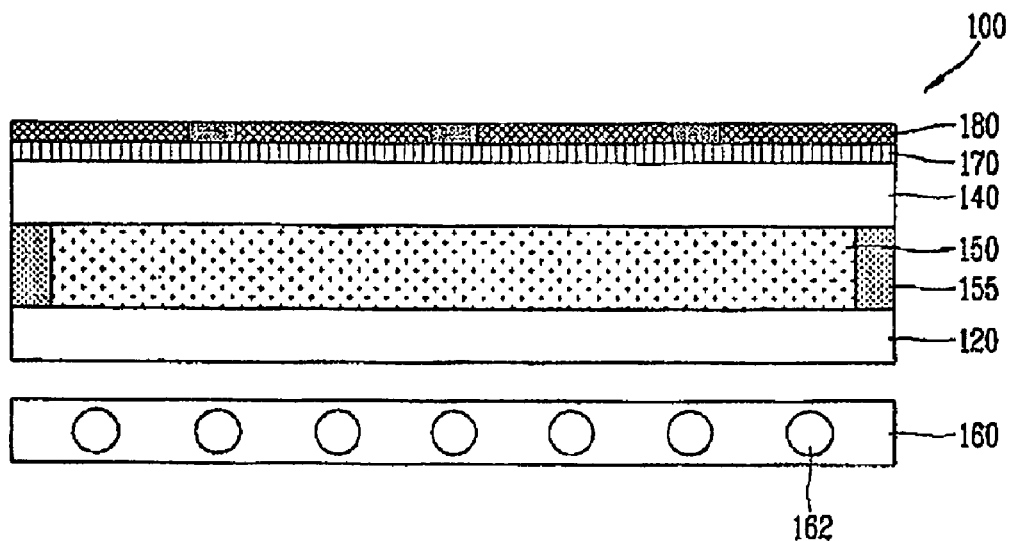

As aforementioned, after attaching the black resin film 180 onto the polarizer 170 positioned on the LCD panel 100 containing the bad pixel(s), as shown in FIG. 3B, the LCD panel 100 is driven in a black mode. Thus, upon driving the LCD panel 100 in the black mode, light does not pass through the LCD panel 100 by the liquid crystal layer 150 and the polarizer 170 in normal pixels, whereas the light is directly transmitted through the liquid crystal layer 150 and the polarizer 170 in bad pixels (i.e., the bright points are generated). Hence, in the black resin film 180 attached to the entire surface of the LCD panel 100, as shown in FIG. 3C, the hardening layer 108a (or 181a) of the black resin film 180 corresponding to spots where the bright points have been generated is hardened by the light from the bright points, to thereby be firmly or fixedly attached onto the polarizer 170.

Figure 3D:
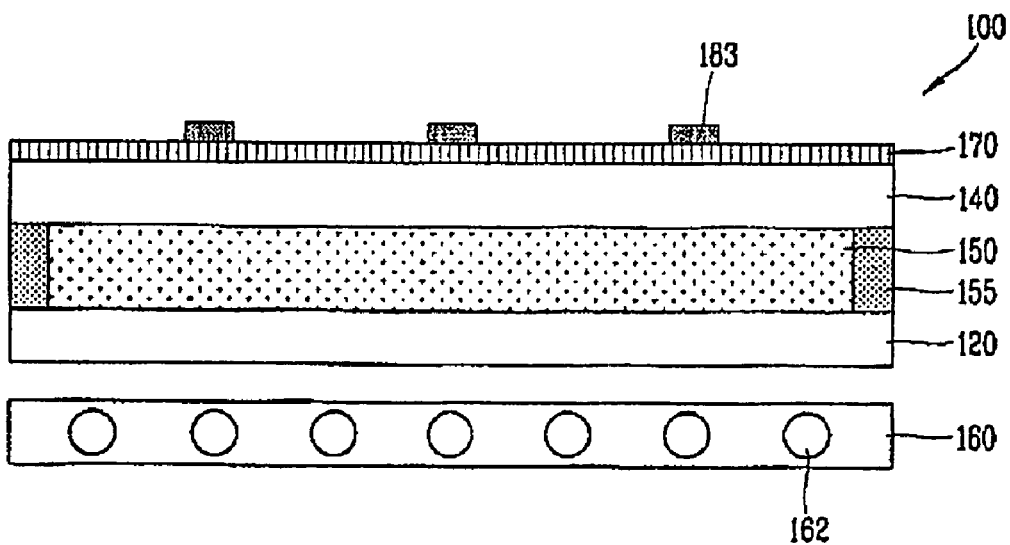

Afterwards, the black resin film 180 is removed, e.g., using a known technique, as shown in FIG. 3D, except that the portions (183) of the black resin film 180, which have been hardened by the bright point's light and thus now fixedly attached onto the polarizer 170 still remain on the polarizer 170. Since the remaining, hardened black resin film (183) includes the black resin layer (180b or 181b), the remaining black resin film 183 functions to prevent light from being leaked through the bad pixels and thus functions as a light shielding layer. Such light shielding layer (black resin film 183) is used to change the bright point due to the bad pixel into the dark point. As a result, a viewer of the LCD panel does not and can not notice the presence of the bad pixel(s). Here, although not shown, a passivation layer may be formed on the polarizer on which the black resin film 180 is formed.

The black resin film 180 can be placed over a plurality of LCD panels at a time so that any defective pixel in the LCD panels can be compensated in a mass production manner.

As aforementioned, in the present invention, since the black resin film 180 is attached, a portion of the black resin film 180 at the spot where the bad pixel has been formed is then hardened by light which has passed through and generated due to the bad pixel. Thereafter the other portions of the black resin film 180 are removed, so that the light shielding layer (i.e., the remaining, hardened black resin layer 183) remains exactly only at the spot where the bad pixel has been generated. Hence, it is possible to accurately and completely cover every bad pixel. Also, since the black resin film 180 is hardened by the light from the bad pixels, the present invention effectively utilizes the existing resources to address the problem, and it is possible to easily and quickly cover the bad pixels of the LCD device.

Also, the present invention can be achieved without separately undergoing a lighting test for detecting bad pixels. If there is no bad pixel, there is no light transmitted through the LCD panel when the LCD panel is initially operated in the black mode. Accordingly, the black resin film attached to the LCD panel is not hardened at all at any spot. But if there is a bad pixel, the light from the bad pixel will harden the corresponding portion of the black resin film 180. Thus, when the black resin film 180 is then removed, the light shielding layer for effectively addressing the defective pixels is formed only for the defective pixels of the LCD panels. In the view of this, the present invention may be applied to thus omit a separate testing process for detecting the bad pixels.

In addition, the black resin film (180) can directly be attached onto a glass substrate (e.g., 140) of the LCD panel rather than onto the polarizer (170). The polarizer may not be provided on the LCD panel according to an operation mode of the LCD device. Also, the polarizer may possibly be disposed within the LCD panel. In this case, the black resin film can directly be attached onto the glass substrate.

As described above, the present invention can be achieved such that the black resin film is provided on the LCD panel and then selectively hardened to correspond to the bright spot at which the bad (defective) pixel has been formed or generated, by the light which has passed through and generated due to the bad pixel, thereby forming the light shielding layer selectively over the bad pixel. Accordingly, it is possible to easily and quickly form the light shielding layer accurately at the defective pixel spots at any time, so as to address the defective pixel problems in a cost-effective and efficient manner.

As the present invention may be embodied in several forms without departing from the spirit or essential characteristics thereof, it should also be understood that the above-described specific structures and method for the LCD device are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for addressing a defective pixel of a liquid crystal display (LCD) device, the method comprising:
    forming a black resin film on at least one LCD panel having a plurality of pixels;
    operating the LCD panel in a black mode to block light except for the defective pixel, the light from a back light being irradiated to a region of the black resin film corresponding to a whole area of the defective pixel to harden thereof; and
    removing the black resin film, except for the hardened portion of the black resin film.

2. The method of claim 1, wherein the black resin film includes:
    a hardening layer capable of being hardened by a light irradiation; and
    a black resin layer on the hardening layer, for shielding light.

3. The method of claim 2, wherein the black resin film further includes:
    a passivation film on the black resin layer.

4. The method of claim 1, wherein the black resin film includes:
    a hardening layer capable of being hardened by a light irradiation, and mixed with black nano particles; and
    a passivation film on the hardening layer.

5. The method of claim 1, wherein in the forming step, the black resin film is formed on a polarizer or a glass substrate of the LCD panel.

6. A liquid crystal display (LCD) device comprising:
    an LCD panel containing a defective pixel; and
    a light shielding layer formed of at least a black resin and formed at the LCD panel, the light shielding layer being disposed in a region corresponding to a whole area of the defective pixel, so as to shield light transmitted the defective pixel.

7. The device of claim 6, wherein the LCD panel includes:
    a first substrate having a thin film transistor and an electrode;
    a second substrate having a color filter layer; and
    a liquid crystal layer formed between the first and second substrates.

8. The device of claim 6, wherein the light shielding layer is formed on a polarizer or glass substrate of the LCD panel, and the device further comprises a backlight unit for supplying light to the LCD panel.

9. The device of claim 6, wherein the light shielding layer includes:
 a hardening sub-layer capable of being hardened by a light irradiation; and
 a black resin sub-layer on the hardening sub-layer, for shielding light.

10. The device of claim 9, wherein the light shielding layer further includes:
 a passivation film on the black resin sub-layer.

11. The device of claim 6, wherein the light shielding layer includes:
 a hardening film capable of being hardened by a light irradiation, and mixed with black nano particles; and
 a passivation film on the hardening film.

12. A liquid crystal display (LCD) device comprising:
 an LCD panel; and
 a transforming layer on the LCD panel, the transforming layer being hardened by a light through a defective pixel of the LCD panel from a back light, and transforming a bright spot of a whole area of the defective pixel into a dark spots,
 wherein the hardening and the transforming are performed when the LCD panel is operated in a black mode.

13. The device of claim 12, wherein the transforming layer includes:
 a hardening sub-layer capable of being hardened by a light irradiation; and
 a black resin sub-layer on the hardening sub-layer, for shielding light.

14. The device of claim 13, wherein the transforming layer further includes:
 a passivation film on the black resin sub-layer.

15. The device of claim 12, wherein the transforming layer includes:
 a hardening sub-layer capable of being hardened by a light irradiation, and mixed with black nano particles; and
 a passivation film on the hardening sub-layer.

16. The device of claim 12, wherein the transforming layer is provided on a polarizer or a glass substrate of the LCD panel.

* * * * *